United States Patent [19]

Johannson

[11] Patent Number: 4,526,251

[45] Date of Patent: Jul. 2, 1985

[54] CHAIN RETENTION DEVICE

[75] Inventor: Richard J. Johannson, Dallas, Oreg.

[73] Assignee: Towmotor Corporation, Mentor, Ohio

[21] Appl. No.: 405,137

[22] Filed: Jun. 14, 1982

[51] Int. Cl.³ .............................................. B66B 9/20
[52] U.S. Cl. .................................. 187/9 R; 24/116 R
[58] Field of Search ..................... 187/9 R, 9 E, 1 R; 403/312, 391; 24/16 R, 19, 116 R, 116 A, 135 N; 59/88, 93, 34, 78; 248/499, 500, 510

[56] References Cited

U.S. PATENT DOCUMENTS

| 994,865 | 6/1911 | Morris et al. | 24/116 R |
| 1,051,230 | 1/1913 | Holman | 24/116 R |
| 2,652,018 | 9/1953 | Griffith | 24/116 R |
| 3,103,344 | 9/1963 | Figge | 24/135 N |
| 3,950,941 | 4/1976 | Ohrn | 59/93 |
| 4,009,765 | 3/1977 | Leskovec et al. | 187/9 E |
| 4,312,426 | 1/1982 | McVeen | 187/9 E |

FOREIGN PATENT DOCUMENTS 867202 7/1949 Fed. Rep. of Germany ... 24/116 A

Primary Examiner—Joseph J. Rolla
Assistant Examiner—Kenneth Noland
Attorney, Agent, or Firm—Phillips, Moore, Lempio & Finley

[57] ABSTRACT

A retention assembly is disclosed for use with an elongated flexible member (22) such as the lift chain used in a lift truck (10). This assembly consists of a first member (30) affixed to the carriage (28) and having an irregular surface (32) corresponding to the irregular surface (26) of the chain. A second clamping member (34) also has an irregular surface (36) for gripping the lift chain (32) with the first member (30). Fastening members (42 and 44) fix the second member (34) to the first member (30) with the lift chain (22) therebetween.

4 Claims, 3 Drawing Figures

CHAIN RETENTION DEVICE

DESCRIPTION

1. Technical Field

This invention relates to a chain retention device. In particular, it relates to a device for fixing the lift chain of a forklift vehicle to either the carriage, the mast, the cylinder or a portion of the vehicle.

2. Background Art

In material handling vehicles, particularly in a vehicle which has a carriage mounted for vertical movement on a telescoping mast, a means must be provided to cause the carriage to move vertically on the mast structure as the telescoping mast is extended. This is usually accomplished by a flexible member, commonly a lift chain, affixed at one end to the vehicle and reeved over sheaves fixed to the top of the telescoping portion of the mast, and then downwardly for fixture to the carriage.

In multiple-lift masts, it is common to use a plurality of chains, each reeved over the top or bottom of the appropriate section of the mast structure or lifting cylinder. The end result will be the same as described above, wherein the movable carriage will end up at the top of the mast structure upon appropriate extension of the mast sections.

Fixture of one end of the lift chain to the vehicle and of the other end of the lift chain to the fork carriage may be accomplished by using an elongated pin that extends outwardly from each side of the last chain link into holes in a bifurcated connector. Alternatively, a connector fixed to a vehicle for a multiple leaved chain may have a series of spacers extending between the chain leaves, with each spacer having a bore so that the pin of the chain may be passed through the chain leaves and the spacers alternately. Either the bifurcated connector or the connector having the plurality of spacers may include the fine adjustment device or may be fixed directly to the carriage or vehicle. Either of these connectors concentrates the load of the carriage in the single pin fixing the chain links to the connector.

Commonly pairs of chains are utilized for each telescoping section, with an hydraulic motor or jack located between the chains. In the smaller material handling vehicles that are used in the warehouse environment and the like, it is usually necessary to provide relatively fine adjustment to the lengths of the chain so that the loads arranged upon the carriage will be distributed equally between the parallel lift chains. Such fine adjustment is provided in the adjustable lift chain anchor described in U.S. Pat. No. 4,009,765 issued to Leskovec and Kulhanek and assigned to the assignee of this invention. The structure described in that patent admirably serves the purpose for material handling vehicles where fine adjustment between pairs of chains is required; however, the fine adjustment available in that structure is not necessary for the larger material handling vehicles using a single lift chain.

In material handling vehicles incorporating a single lift chain, the interchain adjusting feature is not necessary; nevertheless, length adjustment of the single lift chain may be of value in smaller single chain vehicles to permit the load handling carriage to be positioned at the ground and contactable therewith and adjacent the upper end of the mast uprights. In material handling vehicles such as those used in rough terrain fine adjustment of a single chain arrangement simply is not necessary and in fact increases the cost of manufacture of the vehicle.

Further the adjustable threaded fasteners may take up valuable space, requiring access for adjustment and an extended area for the threaded member.

Finally, the adjustable anchors used in the past may not be appropriate for use in a rough-terrain environment such as construction use, forest products use and unpaved storage yards where dirt and dust may prevent use of the fine adjustment devices.

DISCLOSURE OF THE INVENTION

The present invention is directed to overcoming one or more of the problems discussed above. This invention is directed to a material handling vehicle comprising a telescoping vertical mast, a carriage mounted on the mast, and an elongated flexible chain for moving the carriage vertically on the mast, including a plurality of pivotally interconnected and identical rigid leaves defining longitudinally extending first and second surfaces on opposite sides of the chain. Each of the first and second surfaces are formed as an irregular surface longitudinally and a first set of the leaves are positioned in side-by-side relationship relative to each other and a next adjacent second set of the leaves are positioned in side-by-side relationship relative to each other and are pivotally connected to ends of said first set of leaves to define the irregular surfaces on the first set of leaves and on a portion of the second set of leaves.

A retention assembly for the chain comprising a rigid first member secured to at least one mast and the carriage and a rigid second member with each of the first and second members having an inner surface engaged with and conforming to the irregular surface formed on a respective one of the first and second surfaces of the rigid leaves. Fastening means releasably clamps the chain between the first and second members to prevent longitudinal movement of the chain relative to the first and second members.

BEST MODE FOR CARRYING OUT THE INVENTION

Figure 1:
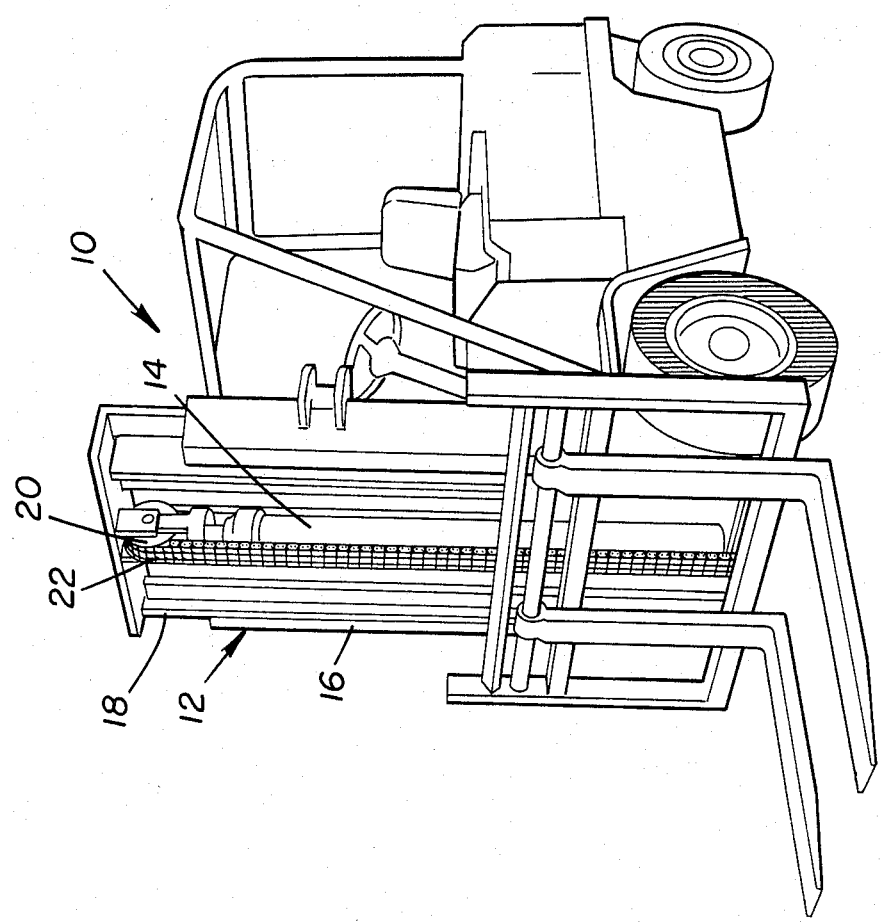
FIG. 1 is a material handling vehicle wherein an embodiment of the present invention is incorporated to anchor the lift chain to the carriage.
Figure 2:
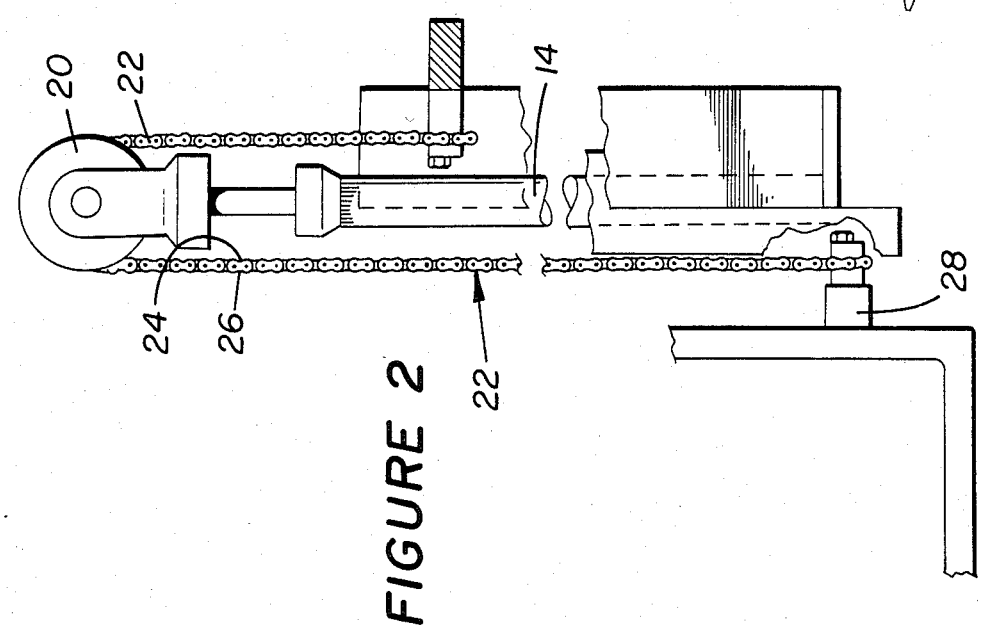
FIG. 2 is a detailed view in elevation of the embodiment shown in FIG. 1 of the lift chain anchor and the carriage assembly.

Referring now to FIG. 1, the material handling vehicle in the form of a forklift 10 is illustrated. Forklift 10 has fixed thereto a telescoping mast structure 12 operable by a hydraulic jack 14. Mast structure 12 consists of a lower of fixed portion 16 and an upper or movable portion 18. It should be understood that this description is applicable to a two-element telescoping mast structure; however, those skilled in the art will recognize that mast structures are made in multiple elements, and the invention disclosed herein would be equally applicable to a multiple-element mast structure.

Figure 3:
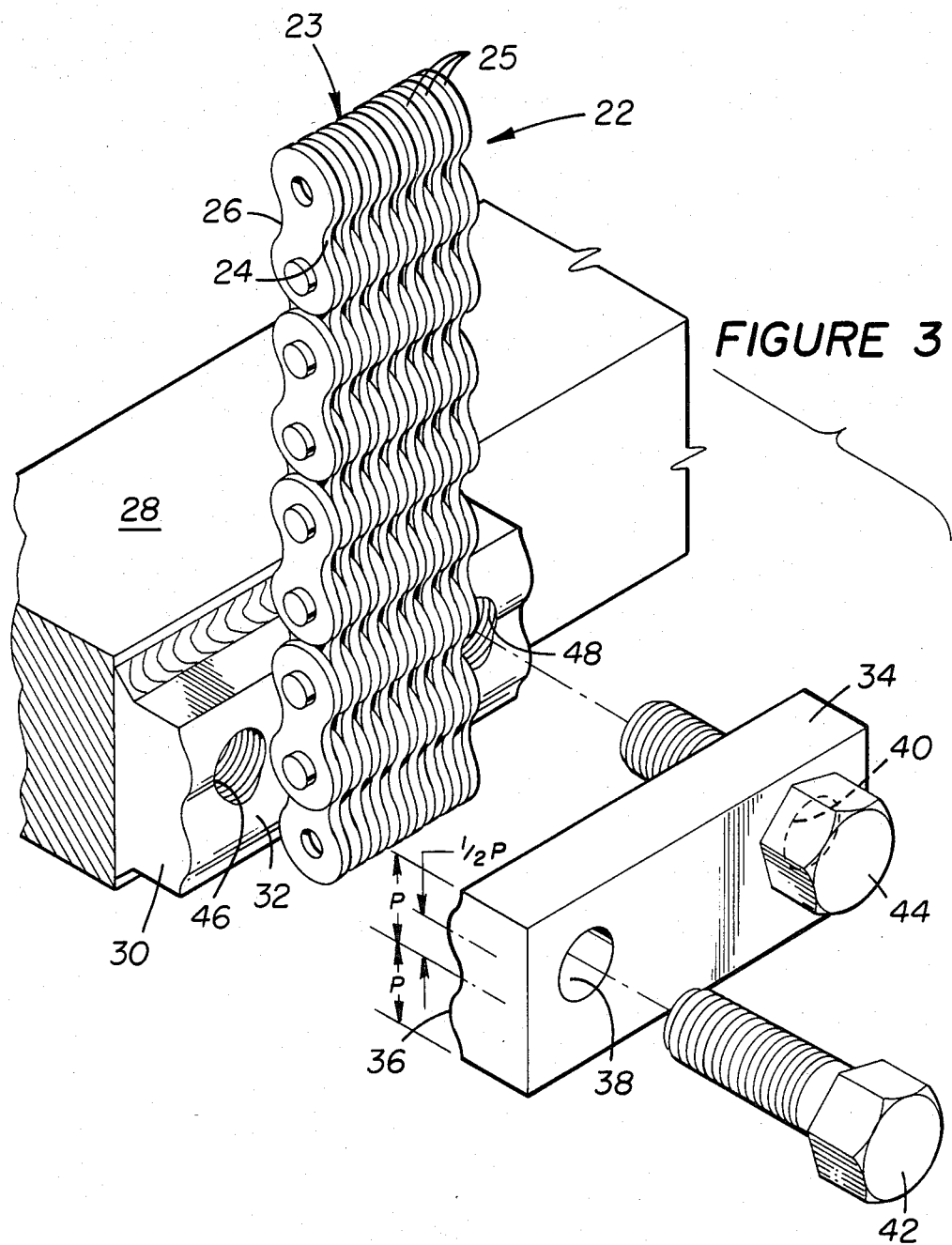
FIG. 3 is a perspective view of the anchor chain retention device disclosed herein.

Telescoping is accomplished through extension of jack 14, which has at its upper end a sheave 20 about which a flexible tension member or lift chain 22 is reeved. Referring to FIG. 3, it can be seen that a lift chain 22 is comprised of a series of links 23, each comprised of a plurality of pivotally interconnected rigid link plates or leaves 25 somewhat similar to a conventional roller chain; however, the plurality of leaves 25 are in a side-by-side relationship as shown in FIG. 3. This type of chain provides a flexible tension member having opposed non-parallel irregular surfaces, and in this case sinuous longitudinal surfaces 24 and 26, as can be seen in FIG. 3.

This flexible tension member in the form of lift chain 22 is affixed to a carriage 28 by a retention assembly consisting of a first member or block 30 affixed to the workpiece or carriage 28 by welding or the like. Block 30 has a surface 32 that has a sinuous surface that conforms to one of the opposed longitudinal surfaces of the lift chain.

A second member or clamping block 34 is likewise formed with a sinuous surface 36 that conforms to the corresponding portion of the other of the opposed longitudinal surfaces of the lift chain 22. Block 34 is formed with a pair of bores 38 and 40 formed to receive fastening member such as bolts 42 and 44. Bolts 42 and 44 may then be threadably engaged in corresponding threaded bores 46 and 48 formed in block 30. By positioning the sinuous surfaces of lift chain 22 between blocks 30 and 34, the lift chain may be fixed to carriage 28 by tightening of bolts 42 and 44 appropriately.

Referring to FIG. 3, it can be seen that the sinuousity of link chain 22 is regular or periodic. At least one-half of one period P, indicated in FIG. 3 as ($\frac{1}{2}$)P on block 34, is sufficient to anchor link chain 22 to the workpiece or carriage 28. It is also appropriate to utilize multiple periods such as the two shown in FIG. 3.

It is also noted that the periodicity of the chain and the corresponding periodicity of the clamping blocks 30 and 34 permit the chain to be anchored at any point along its entire length without the necessity of breaking the chain. This capability provides a gross adjustment in chain length of one period P of the chain. With previous lift chain anchoring devices, it was usually necessary to remove a link pin before the chain could be connected to either the vehicle or the workpiece.

Industrial Applicability

Referring again to FIG. 1, this chain retention assembly is shown in a lift truck environment wherein one end of the lift chain 22 is fixed to the vehicle in a conventional manner such as by utilizing the last pin in the link chain in a conventional manner. It should be understood that the retention assembly described herein can be used at both ends of the chain, that is, at the fixed end on the vehicle, as well as on the carriage 28, as has been described. As noted above, the chain 22 is fixed to the carriage by clamping it between the blocks 30 and 34 in the manner depicted in FIG. 3. As can be seen in FIG. 3, the blocks 30 and 34 can be made as wide as is necessary to receive the particular lift chain for the vehicle in which the anchor is to be utilized. Furthermore, blocks 30 and 34 can accept a plurality of chains in a multiple lift chain type vehicle merely by lengthening the blocks 30 and 34 appropriately. It should be understood that several fastening holes may be appropriate for such an installation. However, it is considered that the number of fastening holes would be dictated by the particular environment in which the assembly is to be utilized.

While this invention is illustrated in the material handling area, it must be understood that the anchor or retention device can be used in any application where it is necessary to anchor any flexible tension member such as a link chain to a workpiece.

Other aspects, objects, and advantages of this invention can be obtained from a study of the drawings, the disclosure, and the appended claims.

I claim:

1. A material handling vehicle (10) comprising
   a telescoping vertical mast (12),
   a carriage (28) mounted on said mast (12),
   an elongated flexible chain means (22) for moving said carriage (28) vertically on said mast (12), said chain means (22) including a plurality of pivotally interconnected and identical rigid leaves (25) defining longitudinally extending first (26) and second (24) surfaces on opposite sides of said chain said first set of leaves to define said irregular surfaces on said first set of leaves and on a portion of said second set of leaves, and
   a retention assembly comprising
   a rigid first member (30) secured to at least one of said mast (12) and said carriage (28),
   a rigid second member (34), each of said first (30) and second (34) members having an inner surface (32/36) engaged with and conforming to the irregular surface (26/24) formed on a respective one of said first (26) and second (24) surfaces, and
   fastening means (42, 44) for releasably clamping said chain means (22) between said first (30) and second (34) members to prevent longitudinal movement of said chain means (22) relative to said first (30) and second (34) members.

2. The vehicle (10) of claim 1 wherein said irregular surface (26/24) is periodic and wherein said inner surface (32/36) has a longitudinal dimension that is at least one-half of a period ($\frac{1}{2}$P).

3. The vehicle (10) of claim 2 wherein said longitudinal dimension is at least one period (P).

4. The vehicle (10) of claim 1 wherein said second member (34) comprises a clamping block and said fastening means (42, 44) comprises a pair of bolts disposed on either side of said chain means (22), each of said bolts (42, 44) extending through said clamping block (34) and being threadably secured to said first member (30).

* * * * *